(12) United States Patent
Gordeychik et al.

(10) Patent No.: US 10,873,590 B2
(45) Date of Patent: Dec. 22, 2020

(54) SYSTEM AND METHOD OF CLOUD DETECTION, INVESTIGATION AND ELIMINATION OF TARGETED ATTACKS

(71) Applicant: AO Kaspersky Lab, Moscow (RU)

(72) Inventors: Sergey V. Gordeychik, Moscow (RU); Konstantin V. Sapronov, Moscow (RU); Yury G. Parshin, Moscow (RU); Teymur S. Kheirkhabarov, Moscow (RU); Sergey V. Soldatov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 194 days.

(21) Appl. No.: 15/923,581

(22) Filed: Mar. 16, 2018

(65) Prior Publication Data

US 2019/0104140 A1   Apr. 4, 2019

Related U.S. Application Data

(60) Provisional application No. 62/573,830, filed on Oct. 18, 2017.

(30) Foreign Application Priority Data

Sep. 29, 2017 (RU) ................ 2017133842

(51) Int. Cl.
*H04L 29/06* (2006.01)
*H04L 29/08* (2006.01)
(Continued)

(52) U.S. Cl.
CPC .......... *H04L 63/1416* (2013.01); *G06F 16/27* (2019.01); *G06F 16/951* (2019.01);
(Continued)

(58) Field of Classification Search
CPC ............ H04L 63/1416; H04L 63/1433; H04L 63/145; G06F 21/50; G06F 21/654
See application file for complete search history.

(56) References Cited

U.S. PATENT DOCUMENTS 9,530,016 B1    12/2016  Pomerantz
10,089,461 B1 *  10/2018  Ha ........................... G06F 21/56
(Continued)

FOREIGN PATENT DOCUMENTS

| RU | 141239 U1 | 5/2014 |
| RU | 2538292 C1 | 1/2015 |
| RU | 2587426 A | 6/2016 |

*Primary Examiner* — Ellen Tran
(74) *Attorney, Agent, or Firm* — Arent Fox LLP; Michael Fainberg

(57) ABSTRACT

Disclosed are systems and methods for cloud detection, investigation and elimination of targeted attacks. In one exemplary aspect, the system comprises a computer protection module configured to: gather information on an object in a computer in a network; and save a security notification with the object in an object database in the network; and a module for protection against targeted attacks configured to: search for the object in a threat database in the network; add one or more tags to the object when the object is found in the threat database and adding a correspondence between a record in the object database and the threat database; and determine that a computer attack has occurred when the one or more tags correspond to signatures in a database of computer attacks.

20 Claims, 8 Drawing Sheets

(51) Int. Cl.
*G06F 21/50* (2013.01)
*G06F 16/27* (2019.01)
*G06F 16/951* (2019.01)

(52) U.S. Cl.
CPC ............ *G06F 21/50* (2013.01); *H04L 63/145* (2013.01); *H04L 63/1433* (2013.01); *H04L 67/306* (2013.01); *H04L 2463/121* (2013.01)

(56) References Cited

U.S. PATENT DOCUMENTS

| | | | |
|---|---|---|---|
| 2014/0013434 A1* | 1/2014 | Ranum | H04L 63/145 726/24 |
| 2015/0089645 A1 | 3/2015 | Vandergeest | |
| 2015/0128274 A1 | 5/2015 | Giokas | |
| 2016/0300065 A1 | 10/2016 | Bang | |

* cited by examiner

601

| Object database 112 | |
|---|---|
| Object | Object tag |
| Object 1 <br> <table><tr><th>Notifications</th><th>Tags</th></tr><tr><td>Notification 1</td><td></td></tr><tr><td>Notification 2</td><td></td></tr><tr><td>Notification 3</td><td></td></tr></table> | |
| Object 2 <br> <table><tr><th>Notifications</th><th>Tags</th></tr><tr><td>Notification 4</td><td></td></tr></table> | |

| Threat database 111 | |
|---|---|
| Objects | Tags |
| Object 1 | OT1, OT4, OT5 |
| Object 3 | OT2 |
| Object 7 | OT7, OT10 |
| Object 8 | OT11 |

602

| Object database 112 | |
|---|---|
| Object | Object tag |
| Object 1 <br> <table><tr><th>Notifications</th><th>Tags</th></tr><tr><td>Notification 1</td><td></td></tr><tr><td>Notification 2</td><td></td></tr><tr><td>Notification 3</td><td></td></tr></table> | OT1, OT4, OT5 |
| Object 2 <br> <table><tr><th>Notifications</th><th>Tags</th></tr><tr><td>Notification 4</td><td></td></tr></table> | - |

| Suspicious activity database 113 | |
|---|---|
| Sign of suspicious activity | Notification tag |
| Object 1 and notification 2 and OT1 | NT1 |
| (Object 1 or object 2) and notification 4 and OT1 | NT2 |
| Object 7 and notification 5 and OT7 | NT3 |

Object database 112

| Object | Object tag |
|---|---|
| Object 1 <br> <table><tr><th>Notifications</th><th>Tags</th></tr><tr><td>Notification 1</td><td></td></tr><tr><td>Notification 2</td><td>NT1</td></tr><tr><td>Notification 3</td><td></td></tr></table> | OT1, OT4, OT5 |
| Object 2 <br> <table><tr><th>Notifications</th><th>Tags</th></tr><tr><td>Notification 4</td><td>NT2</td></tr></table> | - |

Database of computer attacks 114

| Computer attack signature |
|---|
| Object 1 and OT1 and notification 2 and NT1 |
| (Object 1 or object 2 or object 3) and (OT2 or OT4) and (notification 1 or notification 4) and (NT2 or NT3) |
| Object 7 and OT7 |

Fig. 6b

SYSTEM AND METHOD OF CLOUD DETECTION, INVESTIGATION AND ELIMINATION OF TARGETED ATTACKS

CROSS-REFERENCE TO RELATED APPLICATIONS

This application claims benefit of priority under 35 U.S.C. 119(a)-(d) to a Russian Patent Application No. 2017133842 filed on Sep. 29, 2017, and the benefit of priority under 35 U.S.C. 119(e) to U.S. Provisional Application No. 62/573,830 filed on Oct. 18, 2017, both of which are incorporated by reference in its entirety herein.

FIELD OF TECHNOLOGY

The present disclosure relates generally to the field of computer security and particularly to systems and methods for cloud detection, investigation and elimination of targeted attacks.

BACKGROUND

At present computer attacks, alongside traditional malicious software (such as viruses, Internet worms, keyloggers, encrypters, etc.), have become widespread, especially targeted attacks ("TA") and advanced persistent threats ("APT") against an information system (the totality of computing devices and communications used to link them together; the information system is also known as a corporate infrastructure). Hackers may have various goals from simple theft of personal data of employees to industrial espionage. Oftentimes, hackers have information about the architectures of corporate networks, the principles of the internal document flow, the means used to protect the networks and the computer devices, or any other information specific to the information system. This information allows the hackers to get around the existing means of defense, which oftentimes do not possess flexibility in their settings to meet all the needs of the information system.

The existing technologies for defending against malicious software and computer threats, such as signature analysis, heuristic analysis, emulation, and others, have a number of deficiencies, preventing them from providing the proper level of protection against targeted attacks and other computer attacks. For example, existing technologies are unable to detect and investigate previously unknown threats, computer attacks without the use of malicious software, complex attacks (using technologies to get around the means of defense) and long-duration attacks (from several days to several years), the signs of which become known only after some period of time.

Thus, the technical problem arises of the poor quality of determining the signs of computer attacks against an information system.

However, the technology known in the prior art in many instances is unable to identify a computer attack and its signs, because this requires the sending of an executable file to a server, and furthermore many computer attacks, and especially targeted attacks, take place without the use of malicious software. Thus, the technology presented above is unable to solve the stated technical problem. For example, present-day targeted attacks may use PowerShell for the dynamic creation of malicious code and its loading directly into the computer memory without leaving any artifacts on the hard disk—in this case, there are no copies of the malicious software, while the PowerShell interpreter itself is not malicious software. Another example might be the use of legitimate tools for malicious purposes: a remote administration utility (LiteManager, TeamViewer and so on) for remotely controlling the compromised computers, legal Windows utilities (bitsadmin, certutil and so on) for loading malicious software onto compromised computers, administration tools (wmic, psexec and so on) for remote launching of commands, and a "lateral movement"-type attack in which the hacker successively hacks the account data of the users of a network to obtain account data of the domain administrator, and consolidate himself in the compromised infrastructure.

SUMMARY

Disclosed are systems and methods for cloud detection, investigation and elimination of targeted attacks.

In one exemplary aspect, a method for detecting computer attacks is provided, the method comprising gathering, using a hardware processor, information on an object in a computer in a network, saving a security notification with the object in an object database in the network, searching for the object in a threat database in the network, adding one or more tags to the object when the object is found in the threat database and adding a correspondence between a record in the object database and the threat database and determining that a computer attack has occurred when the one or more tags correspond to signatures in a database of computer attacks.

In another aspect, the method further comprises searching for suspicious activity based on the one or more tags in a suspicious activity database, when a sign of suspicious activity is found in the suspicious activity database, adding a second tag to the security notification and determining a computer attack has occurred when the object, a first tag, a second tag are found in a database of computer attacks.

In another aspect, the second tag is only added if a predetermined event has occurred on the computer or a predetermined action has been performed which are signs of suspicious activity.

In another aspect, when the determination of the computer attack is uncertain, the method includes performing one of: a memory dump of the computer to confirm the determining of the computer attack and logging steps of detecting the attack.

In another aspect, the information on an object comprises one or more of behavior of the object, events in an operating system of the computer, information on interaction of the object between networks, indicators of comprise, and metadata of the object.

In another aspect, the correspondence is defined by agreement between check sums of the object in the threat database and the object database.

In another aspect, the tag is a characteristic related to the object or related to an event performed by or on the object.

In another aspect, an object comprises one or more of a file, a hash of the file, a process, a URL address, an IP address, a certificate, a file execution log In another aspect, the security notification includes information gathered about the object.

In another aspect, the security notification includes a time stamp.

In one exemplary aspect, a system for detecting computer attacks is provided, the system comprising a computer protection module configured to: gather information on an object in a computer in a network; and save a security notification with the object in an object database in the network; and a module for protection against targeted attacks configured to: search for the object in a threat database in the network; add one or more tags to the object when the object is found in the threat database and adding a correspondence between a record in the object database and the threat database; and determine that a computer attack has occurred when the one or more tags correspond to signatures in a database of computer attacks.

In one exemplary aspect, a non-transitory computer readable medium storing thereon computer executable instructions is provided, the instructions when executed by a hardware processor, performs a method for detecting computer attacks comprising: gathering, using a hardware processor, information on an object in a computer in a network, saving a security notification with the object in an object database in the network, searching for the object in a threat database in the network, adding one or more tags to the object when the object is found in the threat database and adding a correspondence between a record in the object database and the threat database and determining that a computer attack has occurred when the one or more tags correspond to signatures in a database of computer attacks.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 6a-6b present an example of adding object tags and to security notifications, according to an exemplary aspect of the present disclosure.

DETAILED DESCRIPTION

Figure 1:
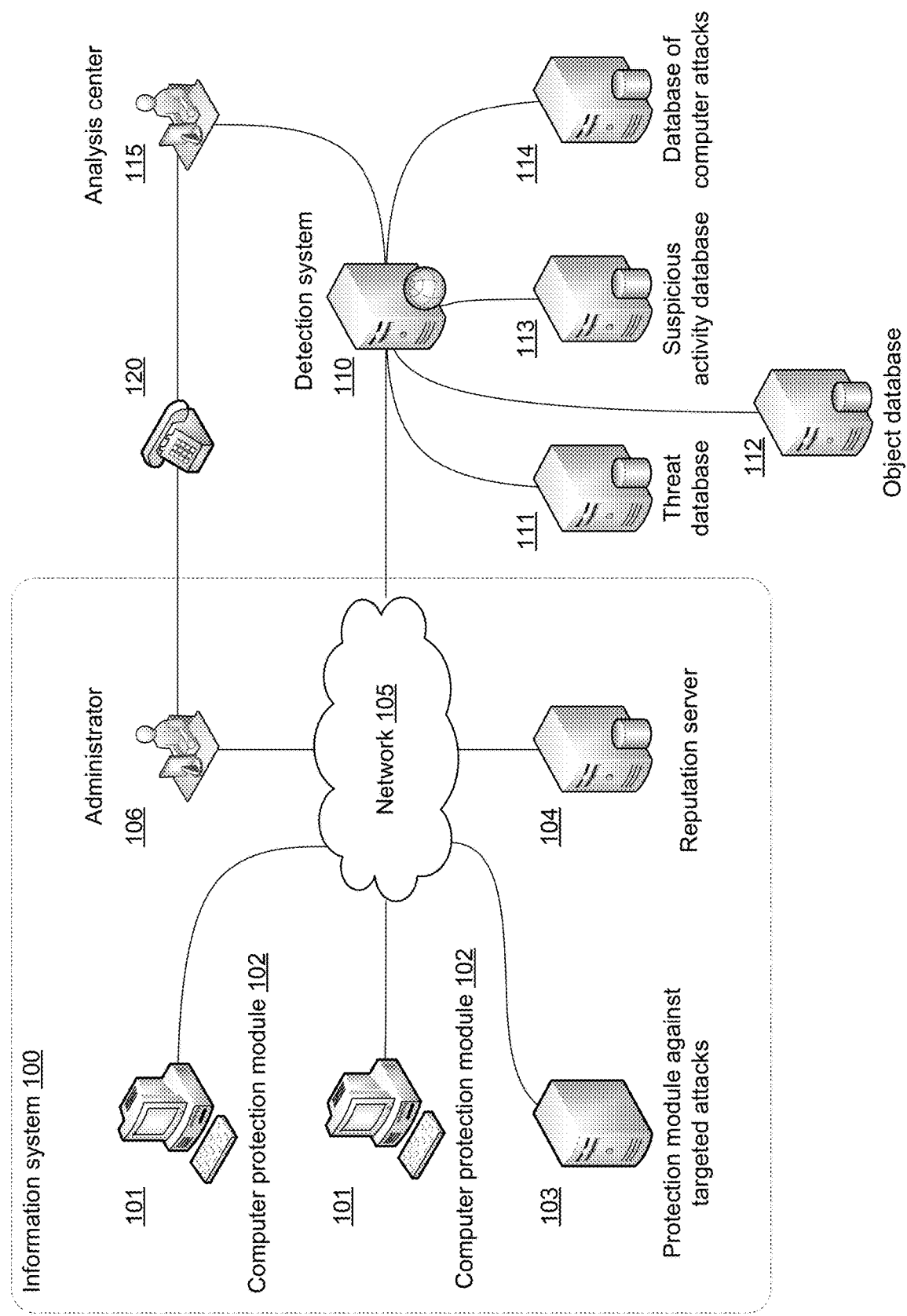
FIG. 1 is a block diagram of a system for cloud detection, investigation and elimination of targeted attacks, according to an exemplary aspect of the present disclosure.

Exemplary aspects are described herein in the context of a system, method, and computer program product for systems and methods for cloud detection, investigation and elimination of targeted attacks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout the disclosure, drawings and claims.

Indicators of compromise (IOC), less often referred to a forensic artifact or remnant of an intrusion that can be identified on a host or network. Typical indicators of compromise are, for example, virus signatures, IP addresses, check sums of files, URL addresses, and domain names of botnet command centers which are known from previous computer attacks. A number of standards exist for indicators of compromise, in particular: OpenIOC (https://community.rsa.com/docs/DOC-62341,https://web.archive.org/web/20160401023434, http://blogs.rsa.com/understanding-indicators-of-compromise-ioc-part-i/, http://openioc.org/), STIX (https://stix.mitre.org/), CybOX (https://cybox.mitre.org) and others.

A computer attack is a group of clandestine and lengthy steps carried out by a hacker and directed at the information system of an organization or a physical person in order to penetrate the network and inflict various kinds of harm on the organization or physical person.

A targeted attack or TA is a computer attack on an information system of a particular organization or a particular physical person in order to penetrate the network and inflict various kinds of harm on the organization or physical person.

A advanced persistent threat or APT is a complex, lengthy, well-planned and multipronged computer attack utilizing complex malicious software, social engineering methods, and data on the information system of the victim.

A fuzzy hash (also flexible fingerprint or locality sensitive hash) is a fingerprint of a file which is formed so that a slight change in the file does not entail a change in the fingerprint. That is, when detecting a malicious file using the value of its fingerprint, a number of similar (possibly unknown) malicious files will also be detected. The main feature of such a fingerprint is its invariance to minor file changes.

An fuzzy verdict is a response of an antivirus application upon detecting suspicious actions of a file such as are characteristic of a malicious file. An fuzzy verdict is returned, for example, upon detecting a file with the aid of a flexible fingerprint. The fuzzy verdict indicates that the detected file is malicious with a certain degree of probability.

FIG. 1 a block diagram of a system for cloud detection, investigation and elimination of targeted attacks, according to an exemplary aspect of the present disclosure. The information system 100 (also the corporate infrastructure) includes a group of computers 101, linked together by a computer network 105. By computers 101 is meant in general any given calculating devices and sensors, especially personal computers, notebooks, smartphones, as well as communication devices such as routers, switches, concentrators, etc. The information system 100 may be organized with the use of any topology of the network 105 known in the prior art, such as one of the following types: fully-connected, point-to-point, bus, star, ring or circular, mesh, tree, daisy chain or hybrid type. In some of the computers 101 there are installed computer protection module 102. It should be noted that a computer protection module 102 might not be installed in certain computers 101. The information system 100 may also include a module for protection against targeted attacks 103, which may be placed, for example, on a separate server. A reputation server 104 may be situated in the information system 100 or in a service provider cloud service (i.e., it is connected to a detection module 110). It should be noted that the computer 101 may be either a physical device or a virtual machine. Proxy servers (not shown in the figure) may be used for the connecting of the computers 101 by means of the network 105 to the Internet and the detection module 110.

The computer protection module 102 and, optionally, the module for protection against targeted attacks 103 serve to gather information about objects on the computer 101 and in the network 105. The computer protection module 102 and the module for protection against targeted attacks 103 may also be referred to as protection modules 102-103. In a particular exemplary aspect, the object may be a file, a hash of that file, a process, a URL address, an IP address, a certificate, a file execution log or any other object detected on the computer 101. The information gathered is information about suspicious events which are connected to said objects on the computers 101 and in the network 105. The computer protection module 102 then sends a security notification, by the network 105, to the detection module 110 (the cloud service of the service provider). The security notification may include, in particular, information about the protection module itself (its identifier etc.) and the information gathered about the objects. In a particular exemplary aspect, the security notification may also include a time stamp (e.g., the moment of time or the interval of time during which said information was gathered about the object). In a particular exemplary aspect, the protection modules 102-103 are used to gather the following information about objects:

the behavior of processes (such as the execution trace);
events in the operating system (OS)—records in the event log of the OS;
information on interaction between networks;
indicators of compromise;
verdicts of the protection module or the modules of the protection module (including fuzzy verdicts) or test signatures;
metadata of an object, including the check sum of an object.

The module for protection against targeted attacks (or the targeted attacks protection module) 103 may be linked by the network 105 to the computer protection module 102 and performs an analysis of the network activity of the information system 100. Additionally, the targeted attacks protection module 103 detects targeted attacks in the information system by detection of objects of the computers 101 with the use of a "sandbox" (in some aspects), a computer environment for the safe executing of processes, and other detection technologies (for more details, see FIGS. 2-3).

The module of protection against targeted attacks 103 gathers information being sent in the network traffic. Thus, the module of protection against targeted attacks 103 gathers information on all objects being transmitted by the network 105 from the computers 101, including those computers 101 on which no computer protection module 102 is installed.

Information about the objects in the network 105 may include verdicts of the module for protection against targeted attacks 103, suspicious behavior in the network traffic, in the DNS traffic, and the results of the emulation of objects from email or Internet.

In a particular exemplary aspect, the protection modules 102-103 gather information on all the aforementioned objects. In another exemplary aspect, the protection modules 102-103 may contain a list of safe (legitimate) objects (for which it is known precisely that they are not malicious or suspicious) and a list of malicious and suspicious objects (not shown in the figure). In this example, the protection modules 102-103 gather information not only on the objects from the list of malicious and suspicious objects, but also information about unknown objects (which are absent from the list of malicious and suspicious objects, as well as the list of safe objects).

In yet another exemplary aspect, the modules for protection 102-103 may contain a list of supplemental objects about which information needs to be gathered. Such a list of objects may be formulated, for example, by an administrator 106. In yet another particular exemplary aspect, the administrator 106 may formulate a list of malicious and suspicious objects (e.g., actions) and a list of safe objects, adding or subtracting objects from these lists.

For example, the administrator 106 may indicate a list of forbidden actions and a list of allowed actions. For example, in the information system 100 it may be forbidden for some computers 101 to use the utility "psexec", since this can be used by hackers for remote administration. Information about objects associated with forbidden actions is gathered by the protection modules 102-103. Thus, if the use of the utility psexec has been executed in a particular computer 101 or in the network 105, information about the use will be sent to the detection module 110, where a marker will be added that corresponds to such use. The lists of forbidden and allowed actions may be stored either in the information system 100 or in the detection module 110. If the targeted attacks protection module 103 has detected the use of the utility psexec on a computer 110 where no computer protection module 102 is installed, the checking of the allowability of use of "psexec" on that computer and the adding of the corresponding tag may be done either by the targeted attacks protection module 103 or by the detection module 110 using the list of forbidden actions. In yet another particular exemplary aspect, if there is no information present in the list of forbidden actions or the list of allowed actions, an analysis center 115 may ascertain from the administrator 106 whether the detected action is allowable and, if the action is not allowed, add the corresponding tag.

The detection module 110 saves a received security notification in an object database 112, and then performs a search for objects in the security notification to determine if they are found in a threat database 111. Upon finding an object from the security notification in the threat database 111, the detection module 111 adds a tag in the object database 112 for the object found and a correspondence to the found object in the threat database 111. The correspondence may be defined, for example, by agreement between the check sums of the object in the threat database 111 and in the object database 112.

The tag of an object is a characteristic of the event occurring on the computer 101, a characteristic related to the object found or to a characteristic related to an event performed by the object or on the object. Thus, the tag of an object may be added to the object if and only if a particular event has occurred on the computer 101 or a particular action related to the object has been performed. In a particular exemplary aspect, the tags of an object characterize, for example, the verdicts of the protection modules 102-103 and information about suspicious behavior of an object (on the basis of information about the object). Thus, the tag of an object includes, in particular, the following events (here and afterwards it is assumed that the tag will be added to the object only if the indicated events related to the given object and detected on the basis of the information obtained about the object have occurred on the computer 101):

- substitution of the DNS server on a computer;
- disconnection of automatic update of the operating system;
- disconnection of the network firewall;
- disconnection of a protection module;
- disconnection of UAC (User Account Control, a component of the Windows OS).

In yet another particular exemplary aspect, the tags of an object which are added to the object by the detection module 110 may additionally include the following events:

- information on lack of agreement between the name of an object and its check sum (for example, an executable file which is a remote access application, TeamViewer, has been renamed);
- violation of an authentication profile on the computer (in the course of a given period of time (one, two or more days) during which information was gathered about an object, on the computer 101 an authentication was performed for a particular list of users, and now a user who is absent from that list has been authenticated on the computer 101);
- violation of a network activity profile of a process (in the course of a given period of time (one, two or more days) during which information was gathered about an object, the process interacted in the network with a particular list of IP addresses of the Internet, after which the process connected by the network to an IP address which is absent from that list);
- scheduler/AutoRun settings/OS service/driver tasks which are unique within the given information system 100 and are absent from the list of allowed tasks;
- tags related to the results of a search for an object from external sources of cyber threat intelligence;
- computers 101 on which files are detected which are classified as a keylogger, remote admin tool, monitor, and are found on a small number of computers 101.

In a particular exemplary aspect, if an object is not contained in the list of malicious objects, the detection module 110 may calculate the flexible fingerprint for the object. After this, the detection module 110 may verify whether this flexible fingerprint corresponds to any malicious objects, and if so the initial object will also be marked as malicious by the detection module 110. Moreover, a verdict may be created for the given file and sent to the computer protection module 102 by the detection module 110.

With the use of the detection module 110, a search is made for signs of suspicious activity (i.e., characteristic signs of computer attacks) in a suspicious activity database 113 on the basis of the security notification received and the added tags of the object contained in said security notification. Upon finding a sign of suspicious activity, the tag contained in the suspicious activity database 113 is added to the security notification by the detection module 110. The tag indicates the presence of the sign of suspicious activity which has been found. After this, signs of a computer attack are detected by identifying the signature of computer attacks from a database of computer attacks 114 among the objects and security notifications obtained and the tags of the mentioned objects and security notifications from the object database 112.

When a sign of a computer attack is identified, the conditions of to initiate a thorough investigation and confirmation or disproving of a targeted attack by the analysis center 115 are fulfilled. In a particular exemplary aspect, upon identifying the signature of computer attacks it is possible to confirm unambiguously not only the identification of the signs of a computer attack, but also confirm the identification of a computer attack without the need to conduct an investigation by the analysis center 115. In another exemplary aspect, upon identifying the signature of computer attacks it is not possible to confirm unambiguously a targeted attack, and in this case a further investigation by the analysis center 115 is required.

Tags are added to both the objects and the security notifications, wherein the tag is a characteristic of an event occurring on the computer 101 (the computer 101 from which the information was gathered as contained in the security notification) or an action performed on the computer. Thus, a tag will be added to a security notification if and only if a certain event has occurred on the computer 101 or a certain action has been performed, such as comes under the definition of a sign of suspicious activity.

The tags for security notifications may include signs of suspicious activity, which may include:

- a user performs an authentication on the computer for the first time; an example of the script for the occurrence of such a suspicious event is described as follows. Over the course of one month the protection module 102 gathers a list of user account records having been successfully authenticated on the computer 101. After this, a user is authenticated on the computer 101 with an account record which is absent from the list of account records so formed;
- the remote launching of an object (file/process) occurs; an example of the script for the occurrence of such a suspicious event is described as follows. The remote launching of an object occurs with the use of the Windows Management Instrumentation (WMI) infrastructure or via OS Windows services;
- records have been removed from the event log;
- a file has been launched in the network from an application which is not a browser;
- files not present in white lists are launched from suspicious directories;
- shadow copies have been removed (for example, by the utility vssadmin.exe—this is characteristic of many malicious encryption applications to impede the restoration of the system);
- renamed utilities of remote administration have been detected (AmmyyAdmin, TeamViewer etc.);
- files have been copied into the administrator's network folder (C$, ADMIN$);
- utilities bcdedit.exe have been used to shut off the OS component System startup repair;
- the system process lsass.exe has opened a file or modified a file on disk;
- an obfuscated PowerShell script has been run;
- a Windows API function has been called up;
- a suspicious PowerShell command—Windows API function call has been executed;
- files from suspicious paths have been opened by the library RundlI32.

In a particular exemplary aspect, some of the tags for objects and the tags for security notifications (and accordingly the signs of suspicious activity) may coincide. For example, lack of correspondence between the name of an object and its check sum may be both a sign of suspicious activity and be added as a tag to the object.

The signature of computer attacks (in a particular example, targeted attacks) comprises, in one aspect, a set of the following records: a list of objects, security notifications, and tags of the mentioned objects and security notifications which are characteristic of specific computer attacks and, in particular, targeted attacks. Thus, upon finding a certain combination of records from the signature of a targeted attack, it is possible to confirm the discovery of an attack (or its signs). In one particular exemplary aspect, the signature of a computer attack at the same time contains at least one record about the object, at least one record about the security notification, at least one tag of the object and at least one tag of the security notification. In another particular exemplary aspect, the signature of a computer attack may contain only one or several of the aforementioned records—for example, a record about one object or a record about the object and the tag of the object. In yet another particular exemplary aspect, the signature of a computer attack contains at least one tag of the security notification.

In order to discover all kinds of signs of suspicious activity (violation of the profile of network activity of a process, a computer, violation of the profile of network inputs, etc.), a system of unsupervised machine learning may be used—the system teaches itself on the basis of the incoming security notifications and the affixed tags. After learning, the system will assign tags to security notifications not having a tag in the suspicious activity database 113. Moreover, a system of supervised machine learning may be used to solve the problem of classification of the behavior of a process or a computer. In this case, the factors are signs of suspicious activity and the teaching is done with data for known detected computer attacks.

The object database 112 serves for storing the security notifications containing information about the objects, and also the tags added to the objects and the tags added to the security notifications.

The threat database 111 contains data on known threats. In particular, the threat database 111 contains identifiers and information on objects which are signs of threats. Each object in the threat database 111 is labeled with a corresponding tag. For example, malicious objects may correspond to the tag "malicious object". If an object was used in a specific targeted attack, it will be assigned a corresponding tag.

Let us consider as an example the known targeted attack "Turla". There are known URL addresses related to this. Thus, if an object which is an executable file has accessed said address, that object will have a tag added to it, indicating the corresponding action; for example, the tag "access to URL address connected to APT Turla" will be added to the object.

In yet another example, the targeted attack "Naikon APT" is related to a known set of IP addresses, and if an object has accessed said address, a tag will be added to the object indicating "access to IP address connected to Naikon APT".

The suspicious activity database 113 contains a list of signs of suspicious activity. Each sign of suspicious activity is labeled with a special tag, indicating the targeted attack with which that sign of suspicious activity is connected (examples of signs of suspicious activity have already been given).

In a particular exemplary aspect, if the object is labeled with a particular set of tags, an additional tag indicating this circumstance may be added to that object. Thus, a set of tags may also be labeled with a tag.

The database of computer attacks 114 contains a list of signatures of computer attacks or targeted attacks.

Figure 2:
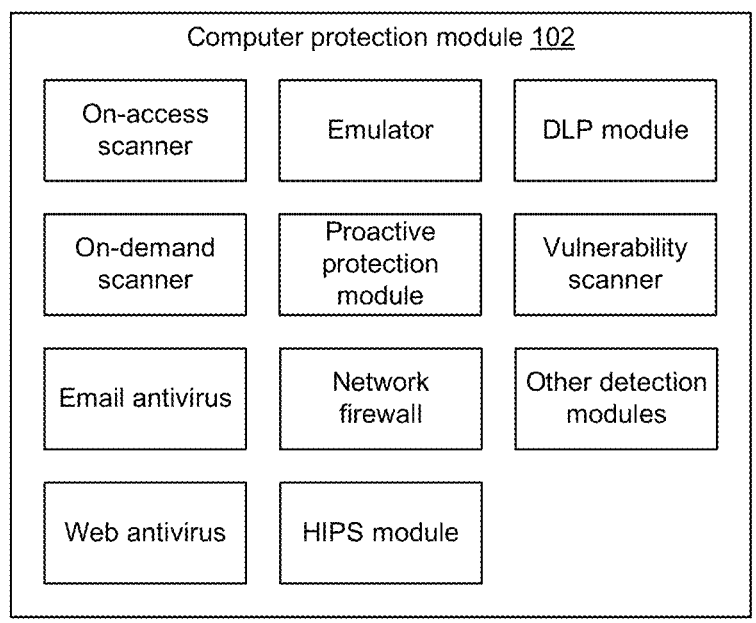
FIG. 2 shows a possible example of the modules of a computer protection module, according to an exemplary aspect of the present disclosure.

FIG. 2 shows a possible example of the modules of the computer protection module 102. The computer protection module 102 may contain modules designed to ensure the security of the computer 101: an on-access scanner, an on-demand scanner, an email antivirus, a web antivirus, a proactive protection module, a HIPS (Host Intrusion Prevention System) module, a DLP (data loss prevention) module, a vulnerability scanner, an emulator, a network firewall, and others. In a particular exemplary aspect, these modules may be part of the computer protection module 102. In yet another exemplary aspect, these modules may be realized as separate software components.

The on-access scanner contains a functionality for detecting malicious activity of all files being opened, run, or saved on the computer system of the user. The on-demand scanner differs from the access scanner in that it scans files and directories specified by the user on demand of the user.

The email antivirus is necessary for checking incoming and outgoing emails for contents of malicious objects. The web antivirus serves to prevent the execution of malicious code which might be contained on web sites when visited by the user, and also to block the opening of web sites. The HIPS module serves to detect undesirable and malicious activity of programs and to block this at the time of execution. The DLP module serves to detect and prevent leakage of confidential data from a computer or network. The vulnerability scanner is necessary to detect vulnerabilities on the computer 101 (for example, certain components of the computer protection module 102 have been shut off, outdated virus databases, network port closed, etc.). The network firewall provides control and filtering of network traffic in accordance with specified rules. The working of the emulator consists in simulating a guest system during the execution of code in the emulator. The proactive protection module uses behavioral signatures to detect the behavior of executable files and classify them according to their level of trust.

The indicated modules for detection of malicious software (suspicious behavior, spam and other signs of a computer threat) create a corresponding notification (which may afterwards be transformed into a verdict of the computer protection module 102), informing the protection module as to a discovered threat and the need to perform actions to remove the threat (for example, deletion or alteration of a file, forbidding an execution, etc.). In a particular exemplary aspect, the module itself having discovered malicious software may perform the actions for removal of the threat. In yet another example, the verdict may be fuzzy or test (since said verdict may be a false alarm)—in this case, the protection module will not perform the actions for removal of the threat, but instead pass on the notification to the detection module 110. It should be noted that the verdict of the computer protection module 102 is part of the information about an object (file, process) which will then be sent to the detection module 110 in the form of a security notification.

Figure 3:
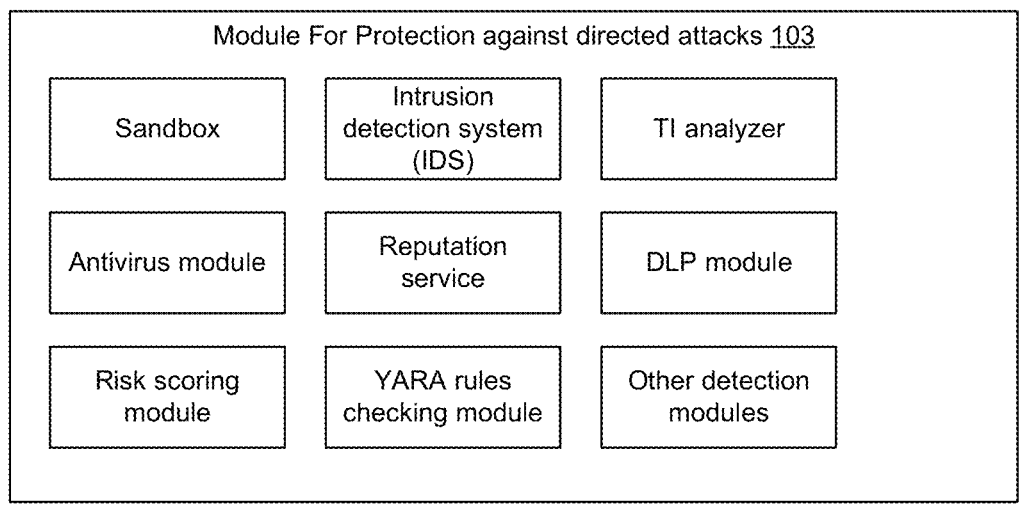
FIG. 3 shows a possible example of the modules of a computer protection module against targeted attacks, according to an exemplary aspect of the present disclosure.

FIG. 3 shows a possible example of the modules of the module for protection against targeted attacks. The module for protection against targeted attacks 103 may contain, for example, the following protection modules: a "sandbox", an Intrusion Detection System (IDS), a reputation service, a YARA rules checking module and other detection modules.

The sandbox module has a functionality similar to that of the emulator of the computer protection module 102 except that the sandbox can use additional computing capabilities and work for a longer time, since the module for protection against targeted attacks 103 has no time limits such as are inherent in the computer protection module 102.

The sandbox is a computer environment for safe execution of processes and it serves to determine suspicious activity during the execution of a process launched from a file.

The sandbox may be realized, for example, in the form of a virtual machine, based on a partial virtualization of the file system and registry, based on rules of access to the file system and registry, or based on a hybrid approach.

The intrusion detection system identifies the facts of unauthorized access to a computer system 101 or network 105 or unauthorized control thereof.

The reputation server may be a mirror or cached copy of the reputation server 104 and furthermore it contains information on the popularity of objects on the computers 101 (the number of computers 101 on which an object is present, the number of times the object is launched, etc.).

The YARA rules checking module is used to check the YARA signatures—an open format of signatures (see http://yararules.com/).

The DLP module serves to detect and prevent leakage of confidential data from a computer or network.

Figure 4:
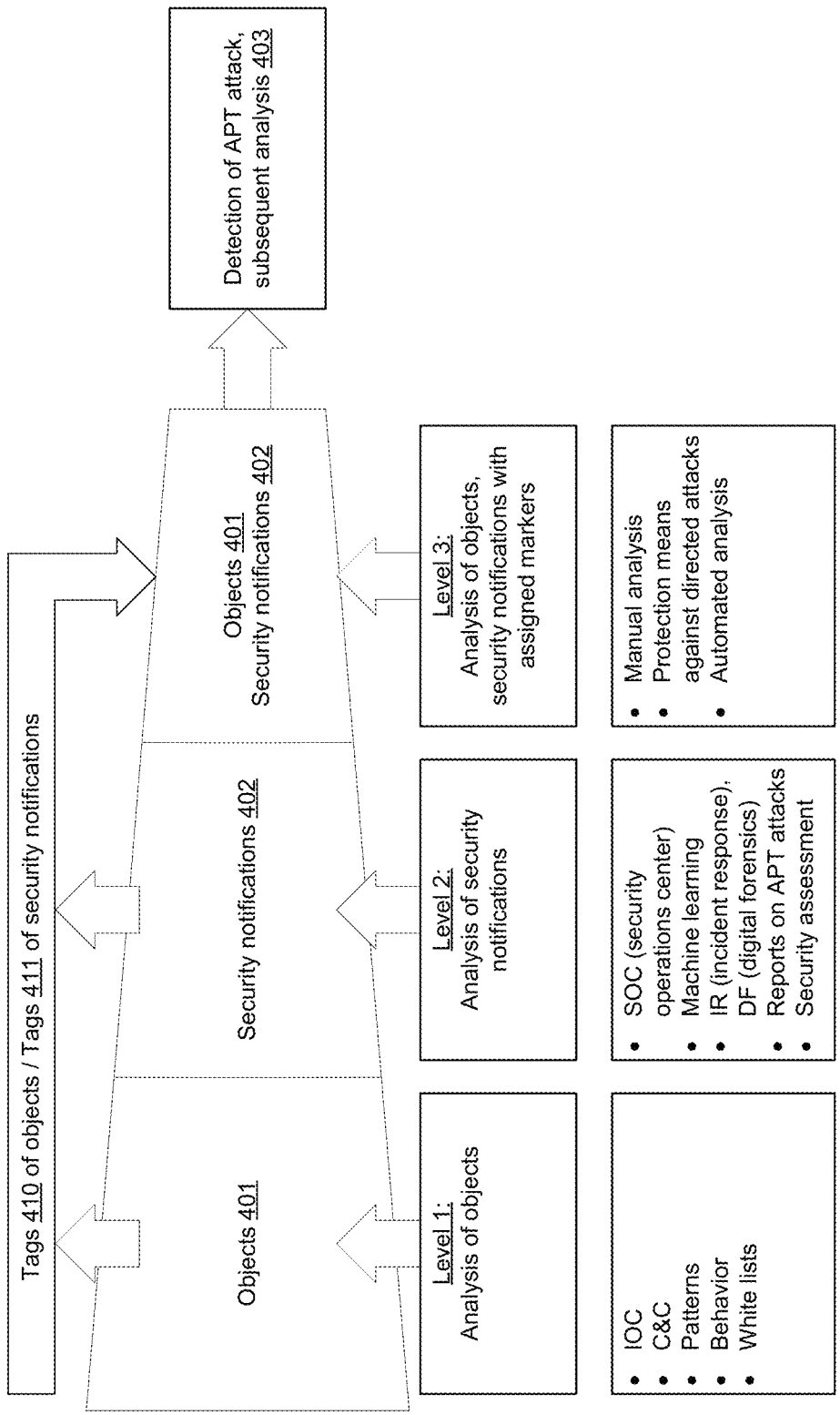
FIG. 4 presents a diagram illustrating the process of adding object tags and to security notifications, according to an exemplary aspect of the present disclosure.

The TI (threat intelligence) analyzer is a module which matches up objects from reports on computer attacks and information about the objects and signs of suspicious behavior. For example, the TI analyzer may determine a list of IP addresses of command centers participating in known computer attacks. The TI analyzer sends the information obtained to a scoring module, which ranks the information about the objects and the signs of suspicious behavior according to the probability of their belonging to a computer attack FIG. 4 presents a diagram illustrating the process of adding object tags and to security notifications. Thus, at least one of the protection modules 102-103 gathers information on an object 401 and sends to the detection module 110 a security notification 402. The detection module 110 extracts the object 401 from the security notification 402 received and does a search for the object 401 in the threat database 111 (Level 1). If the search result is affirmative, the detection module 110 adds a tag 410 corresponding to this object 401 in the threat database 111. In one particular exemplary aspect, when adding a tag to the aforementioned object 401 the information gathered about that object is read. For example, if an object 401 has been detected on a computer that corresponds to defined indicators of compromise (as indicated in the threat database 111), a tag will be added to it, but if the same object 401 has been detected yet no defined indicators of compromise have been found, no tag will be added to it. The detection module 110 then performs a search for signs of suspicious activity (Level 2) contained in the suspicious activity database 113, based on the security notification 402 received and the tags 410 added to the object 402. If a sign of suspicious activity is found, the detection module 110 adds the tag 411 contained in the suspicious activity database 113 to the object database 112, especially to the security notification 402.

As a result, the detection module 110 performs a detection of a targeted attack (Level 3) 403 by identifying the signature of targeted attacks from the database of computer attacks 114 among the received objects 401, security notifications 402 and tags 410 of the objects and tags 411 of the security notifications from the object database 112.

In a particular exemplary aspect, upon confirming a computer attack, the information may be sent to the analysis center 115, which in turn alerts the administrator 106 of the information system 100 as to the detection of an attack, making use in particular of a telecommunications network 120 or the network 105.

In another particular exemplary aspect, in order to confirm a computer attack, the information will likewise be sent to the analysis center 115, which in turn alerts the administrator 106 of the information system 100 as to the detection of an attack, making use in particular of a telecommunications network 120 or the network 105. And, if the administrator 106 communicates that the actions which resulted in the identification of the signature of a computer threat are legitimate, the computer attack will be disproved.

However, if the administrator 106 communicates that the actions which led to the identifying of the signature of a computer threat are not allowed, and if one or more records from the object database 112 are lacking for the identification of the signature of targeted attacks from the database of computer attacks 114, additional information may be requested of the administrator 106 using the analysis center 115. The additional information may include, in particular, the files of one or more computers 101, the log records of the computer protection module 102 (such as the network firewall log or the log of the proactive protection module), the memory dump of one or more computers 101, or the disk dump of one or more computers 101.

Examples of requesting additional information from the administrator 106 by the analysis center 115 are given below in Table 1.

For example, if a virus signature contains an fuzzy verdict as to memory, then in order to confirm a computer attack the memory dump is required (example 1). Other examples are described in detail in Table 1.

TABLE 1

| No | Condition | Information requested |
|---|---|---|
| 1. | Fuzzy memory verdict (access scanner module). | a) memory dump. |
| 2. | A fragment is discovered in the memory, from which fragment the address of a command server has been extracted. The log of the module for protection against targeted attacks 103 or the log of a proxy server (not shown in the figure, the proxy server is used to connect computers 101 in the network 105 to the Internet and to the detection module 110) contains a record as to the computers 101 which have accessed the command server found. A computer protection module 102 might not be installed on those computers 101. | a) log of the module for protection against targeted attacks 103; b) log of the proxy server; c) memory dump of the computers 101 so detected. |
| 3. | A suspicious file has been discovered (absent from the list of safe files and from the list of malicious files). Furthermore, | a) requesting of the detected file from the |

TABLE 1-continued

| No | Condition | Information requested |
|---|---|---|
| | this file has a low reputation according to the data of the reputation server 104. This file is registered in autorun. As a result of analysis of this file by the analysis center 115 it was discovered that the file has the following functionality. When launched from the file, the process reads a text file from a certain directory, decodes it into PE format and launches the execution in its context. To investigate the attack, the analysis center 115 requested of the administrator 106 the contents of the particular directory of the computer 101 on which the suspicious file was discovered. | computers 101 on which it was detected; b) requesting of the content of a particular directory. |
| 4. | The following malicious activity is detected: the process Microsoft Word opened a file of DOC format, which created an executable file of PE format and launched it for execution. The executable file then accessed by HTTP protocol a command and control (C&C) server associated with a known APT attack. However, there is no information about the source of the initial file of DOC format in the object database 112. In order to determine the vector of the original penetration of the information system 100, the analysis center 115 requested a hard disk dump of the computer 101 on which the APT attack was discovered. | a) requesting of a dump of the hard disk of the computer 101 on which the APT attack was detected. |

In a particular exemplary aspect, the signs of suspicious activity depend on the tactics, techniques and procedures (TTP) of computer attacks, and especially targeted attacks.

We shall give an example of TTP. A user has received an office document in the form of an email attachment. The document contained a macro, and the user consented to starting it. The started macro launched the PowerShell interpreter, which downloaded content encoded in Base64 from a site, and launched it without creating any files on the disk. The launched code was executed in the context of the PowerShell process and executed its embedding in the computer system by creating a record in the register HKEY_CURRENT_USER\Software\Microsoft\Windows\CurrentVersion\Run, ensuring the launching of said code whenever the user logs on. This code was a renamed client TeamViewer, which the hacker used to gain remote entry into the compromised system.

In this example, the following signs of suspicious activity will work:
the launching of the PowerShell interpreter from the office application;
the heuristic fuzzy verdict for obfuscation of the PowerShell parameters (compression, encoding in BASE64 and so on);
the HTTP request from the PowerShell interpreter;
the site from which the attachment was downloaded was previously detected in the spreading of malicious software (contained on the list of malicious objects);
the access scanner issued an fuzzy verdict on the downloaded attachment (for example, similar to the result of working of a flexible fingerprint);
a low reputation or popularity of the downloaded attachment was obtained with the use of the reputation server;
the computer protection module 102 issued an fuzzy/confirmed verdict upon scanning the memory of the process PowerShell after downloading the malicious content from the site;
PowerShell modified the register keys for autorun;
the hash for the file registered in autorun does not match the name (for example, the hash of the file matches the hash of the application TeamViewer, but the file name is different).

In yet another exemplary aspect, the signs of suspicious activity depend on information about targeted attacks obtained during the performance of penetration tests (abbreviated: pentest). For example, a penetration test group through a vulnerability in the SMB protocol obtained privileged access to the computer of the administrator, where with the aid of a legal utility it created a memory dump of the process lsass.exe. Authentication data was extracted from the dump, which was then used to access other computers in the network, from which memory dumps were also obtained and authentication data was also extracted. The process was repeated several times until obtaining access to the authentication data of the administrator of the Windows domain.

Examples of signs of suspicious activity have been enumerated above, in the description of FIG. 1.

Figure 5:
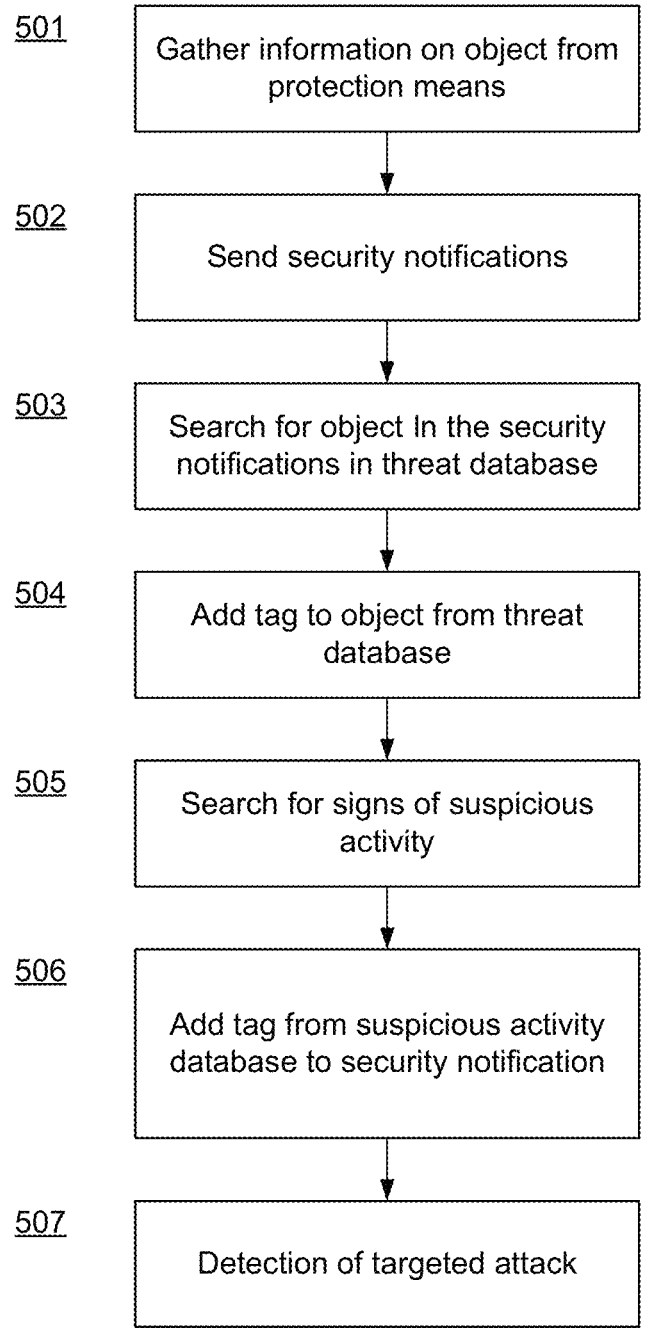
FIG. 5 presents an example of the method of detection, investigation and elimination of targeted attacks, according to an exemplary aspect of the present disclosure.

FIG. 5 presents an example of a method 500 of detection, investigation and elimination of targeted attacks according to one exemplary aspect of the disclosure. In step 501 the computer protection module 102 and/or the module for protection against targeted attacks 103 gathers information about objects (such as files, processes) on the computer 101. Next, in step 502, those protection module send to the detection module 110 a security notification which includes, in particular, information on the protection module itself and the information gathered about the object. The detection module 110 saves the received security notification in the object database 112.

In step 503 the detection module 110 performs a search for objects from the security notification in the threat database 111. To the objects found, in step 504, the detection module 110 adds tags in the object database 112 corresponding to that object in the threat database 111. In step 505 the detection module 110 performs a search for signs of suspicious activity contained in the suspicious activity database 113, based on the received security notification and the added tags for the object contained in the security notification. In step 506, upon finding a sign of suspicious activity, the detection module 110 adds the tag contained in the suspicious activity database 113 to the object database 112, especially to the security notification.

In step 507 the detection module 110 discovers signs of a computer attack by identifying the signature of computer attacks from the database of computer attacks 114 among the objects received, and the security notifications, and the tags of the mentioned objects, and the tags of the security notifications from the object database 112. After discovering the signs of a computer attack, the subsequent investigation of the attack will be done by specialists in computer security from the analysis center 115, collaborating with the administrator 106. In a particular exemplary aspect, upon identifying the signature of computer attacks, it is possible to unambiguously confirm the identification of not only the signs of a computer attack but also confirm the identification of a computer attack without the need for an investigation performed by the analysis center 115. In another exemplary aspect, upon identifying the signature of computer attacks, a targeted attack cannot be confirmed unambiguously, and in this case a further investigation by the analysis center 115 is required.

Thus, the technical problem will be solved, namely, the low quality of determination of the signs of computer attacks against an information system, and the stated technical results are achieved. Namely, the purpose is realized, and also the quality of determination of the signs of computer attacks against an information system is increased as compared to the known solutions by virtue of identifying the signature of computer attacks among the obtained objects, and the security notifications, and the tags of the mentioned objects, and the tags of the security notifications from the object database.

It should be noted that certain attacks, including targeted attacks, might be detected by the protection modules 102-103, and in this case the method as per FIG. 5 will be performed, and the attack will be prevented by the protection modules 102-103 (by deleting the files used in the attack, blocking the traffic, and other actions).

In a particular exemplary aspect, in step 501 the protection modules 102-103 gather in particular information about objects such as:
the behavior of processes;
events in the operating system;
information on interaction between networks;
indicators of compromise (IOC);
verdicts of the protection module (examples of the modules are given in FIGS. 2-3).

In a particular exemplary aspect, upon finding a sign of suspicious activity, a tag from the suspicious activity database is additionally added to the protection module about which information is contained in the aforementioned security notification, and the detecting of the targeted attack is additionally based on a comparing of the tags issued to the mentioned protection module and the signatures of computer attacks from the database of computer attacks 114.

In another particular exemplary aspect, the information about the object additionally contains, in particular, one of:
the check sum of the object or a portion thereof (for example, the check sum of a file or a portion thereof)—such as CRC, the hash functions: MD5, SHA-1, SHA-2, Kessak, GOST R 34.11-2012 and others;
the source of appearance of the object (for example, the IP address of the resource from which the object was downloaded);
the results of an emulation of the execution of the object;
the log of calls of API functions of the operating system from the object (if the object is a process);
the time of appearance of the object within the computing device;
the data being transmitted by the object in the network.

In another particular exemplary aspect, when adding in step 502 a tag to the object from the threat database 111 indicating the need to present the object or additional information about the indicated object, the detection module 110 requests the object or additional information about the indicated object from at least one protection module 102-103, and after obtaining from the protection module the requested object or additional information about the indicated object the steps 503-504 are performed with regard to the newly obtained object or additional information about the indicated object.

In yet another particular exemplary aspect, when adding in step 506 a tag to the security notification indicating the need to present at least one object contained in the security notification, or additional information about the indicated object, the detection module requests the object or additional information about the indicated object from at least one protection module of the information system 100, and after obtaining from the protection module the requested object or additional information about the indicated object the steps 503-506 are performed with regard to the newly obtained object or additional information about the indicated object.

FIGS. 6a-6b present an example of adding object tags and security notifications according to the method described in FIG. 5.

Thus, in step 502 after the detection module 110 obtains security notifications from the protection module, the detection module 110 saves the security notifications in the object database 112. In this example, four security notifications have been received about two objects (see the state 601 of the object database 112 in FIG. 6a).

In step 503 the detection module 110 performs a search for objects from the security notifications in the threat database 111. In the present example, only object 1 is contained in the threat database 111. Object 1 corresponds to the object tags OT1, OT4, OT5, which will be added in step 504 to the object database 112 by the detection module 110. As a result, the object database 112 will take on the state 602.

In step 505 the detection module 110 performs a search for signs of suspicious activity contained in the suspicious activity database 113, based on the received security notification and the added object tags, about which information is contained in the security notification (i.e., for the object database 112 in state 602). In the given example, a match will be found for the first and second sign of suspicious activity from the suspicious activity database 113. Thus, in step 506, there will be added to the notification 2 for object 1 the notification tag NT1 from the suspicious activity database 113, and for notification 4 the notification tag NT2. The object database 112 takes on the state 603 in FIG. 6b.

In step 507 the detection module 110 detects the signs of a computer attack by identifying the signature of computer attacks from the database of computer attacks 114 among the received objects and security notifications and the tags of the mentioned objects and security notifications from the object database 112 (state 603). In the present example, the first signature of a computer attack will be detected, since the object database 112 contains at the same time the object 1 and the tag OT1 and the notification 2 and the notification tag NT1 (i.e., the first signature is contained). Furthermore, the second signature will be detected. Thus, there will be found two signatures at once in the object database 112, testifying to the presence of the signs of a computer attack in the information system 100.

Figure 7:
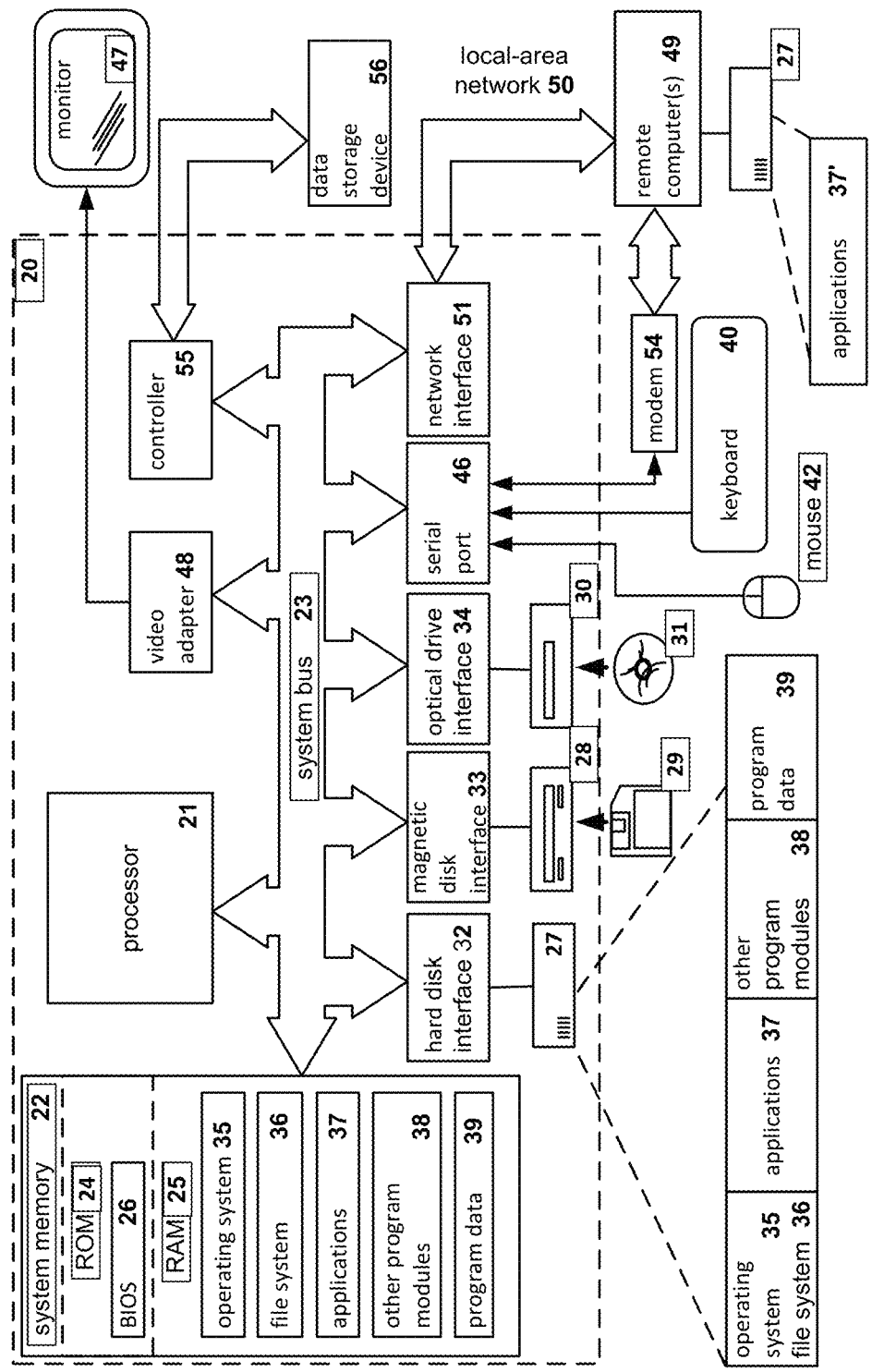
FIG. 7 presents an example of a general-purpose computer system, according to an exemplary aspect of the present disclosure.

FIG. 7 is a diagram illustrating a general-purpose computer system on which aspects of systems and methods of cloud detection, investigation and elimination of targeted attacks may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, supra). Accordingly, each module may be realized in a variety of suitable configurations, and should not be limited to any particular implementation exemplified herein.

In the interest of clarity, not all of the routine features of the aspects are disclosed It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting computer attacks comprising:
gathering, using a hardware processor, information on an object in a computer in a network;
saving a security notification with the object in an object database in the network;
searching for the object in a threat database in the network;
adding one or more tags to the object when the object is found in the threat database and adding a correspondence between a record in the object database and the threat database;
determining that a computer attack has occurred when the one or more tags correspond to one or more signatures in a database of computer attacks, wherein a signature comprises: at least one record about the object, at least one record about the security notification, and at least one tag of the object;
searching, in a suspicious activity database, for suspicious activity based on the one or more tags; and
when a sign of the suspicious activity is found in the suspicious activity database, adding a second tag to the security notification, the second tag being obtained from the suspicious activity database and being indicative of a presence of at least one suspicious activity.

2. The method of claim 1, further comprising:
determining a computer attack has occurred when the object, a first tag of the one or more tags added to the object, and the second tag are found in a database of computer attacks.

3. The method of claim 2, wherein the second tag is added only if a predetermined event has occurred on the computer or a predetermined action has been performed, wherein the predetermined event or the predetermined action is a sign of a suspicious activity.

4. The method of claim 2, further comprising:
when the determination of the computer attack is uncertain, performing one of: a memory dump of the computer to confirm the determination of the computer attack and logging steps of the detection of the computer attack.

5. The method of claim 1, wherein the information on the object comprises one or more of: a behavior of the object, events in an operating system of the computer, information on an interaction of the object between networks, indicators of a comprise, and metadata of the object.

6. The method of claim 1, wherein the correspondence is defined by an agreement between a check sum of the object in the threat database and a check sum of the object in the object database.

7. The method of claim 1, wherein the tag is a characteristic related to the object or related to an event performed by or on the object.

8. The method of claim 1, wherein an object comprises one or more of: a file, a hash of the file, a process, a URL address, an IP address, a certificate, and a file execution log.

9. The method of claim 1, wherein the security notification includes information gathered about the object.

10. The method of claim 1, wherein the security notification includes a time stamp.

11. A system for detecting computer attacks comprising:
a computer protection module executed on a hardware processor and configured to:
gather information on an object in a computer in a network; and
save a security notification with the object in an object database in the network;
a module for protection against targeted attacks executed on a hardware processor and configured to:
search for the object in a threat database in the network;
add one or more tags to the object when the object is found in the threat database and adding a correspondence between a record in the object database and the threat database;
determine that a computer attack has occurred when the one or more tags correspond to one or more signatures in a database of computer attacks, wherein a signature comprises: at least one record about the object, at least one record about the security notification, and at least one tag of the object;
search, in a suspicious activity database, for suspicious activity based on the one or more tags; and
when a sign of the suspicious activity is found in the suspicious activity database, add a second tag to the security notification, the second tag being obtained from the suspicious activity database and being indicative of a presence of at least one suspicious activity.

12. The system of claim 11, wherein the detected module is further configured to:
determine a computer attack has occurred when the object, a first tag of the one or more tags added to the object, and the second tag are found in a database of computer attacks.

13. The system of claim 12, wherein the second tag is added only if a predetermined event has occurred on the computer or a predetermined action has been performed, wherein the predetermined event or the predetermined action is a sign of a suspicious activity.

14. The system of claim 12, further comprising:
an analysis center configured to perform one of: a memory dump of the computer to confirm the determination of the computer attack and logging steps of the detection of the computer attack when the determination of the computer attack is uncertain.

15. The system of claim 11 wherein the information on the object comprises one or more of: a behavior of the object, events in an operating system of the computer, information on an interaction of the object between networks, indicators of a comprise, and metadata of the object.

16. The system of claim 11, wherein the correspondence is defined by an agreement between a check sum of the object in the threat database and a check sum of the object in the object database.

17. The system of claim 11, wherein the tag is a characteristic related to the object or related to an event performed by or on the object.

18. A non-transitory computer readable medium storing thereon computer executable instructions, that when executed by a hardware processor, performs a method for detecting computer attacks comprising:

gathering, using a hardware processor, information on an object in a computer in a network;

saving a security notification with the object in an object database in the network;

searching for the object in a threat database in the network;

adding one or more tags to the object when the object is found in the threat database and adding a correspondence between a record in the object database and the threat database;

determining that a computer attack has occurred when the one or more tags correspond to one or more signatures in a database of computer attacks, wherein a signature comprises: at least one record about the object, at least one record about the security notification, and at least one tag of the object;

searching, in a suspicious activity database, for suspicious activity based on the one or more tags; and when a sign of the suspicious activity is found in the suspicious activity database, adding a second tag to the security notification, the second tag being obtained from the suspicious activity database and being indicative of a presence of at least one suspicious activity.

19. The medium of claim 18, further comprising:

determining a computer attack has occurred when the object, a first tag of the one or more tags added to the object, and the second tag are found in a database of computer attacks.

20. The medium of claim 19, wherein the second tag is added only if a predetermined event has occurred on the computer or a predetermined action has been performed, wherein the predetermined event or the predetermined action is a sign of a suspicious activity.

* * * * *